(12) United States Patent
Serrano et al.

(10) Patent No.: US 11,928,420 B2
(45) Date of Patent: Mar. 12, 2024

(54) METHODS AND APPARATUS FOR MATCHING MEDIA WITH A JOB HOST PROVIDER INDEPENDENT OF THE MEDIA FORMAT AND JOB HOST PLATFORM

(71) Applicant: iCIMS, Inc., Holmdel, NJ (US)

(72) Inventors: Mark Anthony Agee Serrano, New York, NY (US); Vincent Polidoro, New Paltz, NY (US); Jonathan Kristopher Allen, Brooklyn, NY (US)

(73) Assignee: iCIMS, Inc., Holmdel, NJ (US)

( * ) Notice: Subject to any disclaimer, the term of this patent is extended or adjusted under 35 U.S.C. 154(b) by 0 days.

(21) Appl. No.: 17/552,089

(22) Filed: Dec. 15, 2021

(65) Prior Publication Data

US 2023/0186016 A1   Jun. 15, 2023

(51) Int. Cl.
| | | |
|---|---|---|
| *G06F 40/143* | (2020.01) | |
| *G06F 9/54* | (2006.01) | |
| *G06F 40/166* | (2020.01) | |
| *G06Q 10/105* | (2023.01) | |

(52) U.S. Cl.
CPC .......... *G06F 40/166* (2020.01); *G06F 9/543* (2013.01); *G06F 40/143* (2020.01); *G06Q 10/105* (2013.01)

(58) Field of Classification Search
None
See application file for complete search history.

(56) References Cited

U.S. PATENT DOCUMENTS

| | | | |
|---|---|---|---|
| 8,694,396 B1* | 4/2014 | Craner | H04N 21/485 |
| | | | 725/38 |
| 10,296,558 B1* | 5/2019 | McInerny | G06F 40/103 |
| 2014/0019262 A1 | 1/2014 | Reitsma et al. | |
| 2014/0025896 A1 | 1/2014 | Kanefsky | |
| 2014/0358809 A1* | 12/2014 | Gupta | G06Q 10/1053 |
| | | | 705/321 |
| 2015/0347954 A1* | 12/2015 | Stern | G06Q 10/063112 |
| | | | 705/7.14 |
| 2018/0247271 A1* | 8/2018 | Van Hoang | G06F 16/951 |
| 2021/0203694 A1* | 7/2021 | Paquet | G06F 16/9574 |
| 2023/0010938 A1* | 1/2023 | Phillips | G06N 20/00 |

OTHER PUBLICATIONS

Anonymous, "Employment website Wikipedia", Aug. 17, 2021, Retrieved from the Internet at https://en.wikipedia.org/w/index.php?title=Employment_website&oldid=1039217599 on Mar. 8, 2023, 5 pages.

(Continued)

*Primary Examiner* — Kyle R Stork
(74) *Attorney, Agent, or Firm* — Cooley LLP

(57) ABSTRACT

A computer-implemented method is described herein. The method can include identifying a fingerprint associated with a webpage. The fingerprint can be identified in response to a user loading a webpage that includes a job posting. An application programming interface (API) call to query an API can be generated based at least in part on the fingerprint. The API can be associated with a video content provider. The API can be queried to identify a video content to be added to the webpage based at least in part on the API call. The video content can be added automatically to a location on the webpage in response to receiving the video content and based at least in part on the fingerprint.

20 Claims, 7 Drawing Sheets

(56) References Cited

OTHER PUBLICATIONS

Anonymous, "Software widget—Wikipedia", Nov. 26, 2019, Retrieved from the Internet at https://en.wikipedia.org/w/index.php?title=Software_widget&oldid=928100643 on Nov. 20, 2020, 6 pages.
International Search Report and Written Opinion issued in PCT/US2022/081692, dated Mar. 17, 2023, 15 pages.

\* cited by examiner

METHODS AND APPARATUS FOR MATCHING MEDIA WITH A JOB HOST PROVIDER INDEPENDENT OF THE MEDIA FORMAT AND JOB HOST PLATFORM

TECHNICAL FIELD

The present disclosure relates to the field of mapping media with a host provider, and in particular to methods and apparatus for matching media with a job host provider independent of the media format and job host platform.

BACKGROUND

Most webpages today include media assets such as videos, images, audio, etc., to improve user engagement. Identifying the right media content and/or the right media asset and inserting the media asset at an appropriate location on the webpage, however, can often be time consuming. For example, organizations often include videos such as employer branding videos in their career page(s) (e.g., webpage(s) with career/job postings) to engage job seekers. These videos allow the organizations to stay competitive. Managing these videos, however, may be beyond the capability of organizations because most organizations use traditional applicant tracking systems for managing their career page(s).

Accordingly, most organizations employ third-party services to host and manage the media content and/or the media assets. Several drawbacks associated with employing third-party services, however, exist. For instance, one or more administrators of the organization managing the career page(s) may need to map the appropriate media content and/or media asset to an appropriate position on the career page(s). More specifically, an administrator may have to manually review the media asset from the third-party services and insert it at an appropriate position on the career page. In addition to being time consuming, such manual identification and insertion of media assets can be prone to human error. The time consumed and the probability of human error may increase drastically as the number of job postings on the career page(s) increases. For example, mapping video content to a career page with several thousand job postings may take a lot more time and manpower as opposed to mapping video content to a career page with a few hundred job postings.

Furthermore, a single organization may employ several third-party services to provide the media content and/or the media assets. It may be possible that two different third-party services may include media content on two different platforms each with a different format and/or compatibility. Therefore, mapping the media assets to a career page may also require ensuring that media assets from platforms with different compatibilities can be inserted into the organization's career page(s).

Therefore, an unmet need exists for methods and apparatus that can automatically match media assets with a job host provider (e.g., organization hosting career page(s)) independent of the media format or the job host platform.

SUMMARY

In some embodiments, a computer-implemented method is described herein. The method can include identifying a fingerprint associated with a webpage. The fingerprint can be identified in response to a user loading a webpage that includes a job posting. An application programming interface (API) call to query an API can be generated based at least in part on the fingerprint. The API can be associated with a video content provider. The API can be queried to identify a video content to be added to the webpage based at least in part on the API call. The video content can be added automatically to a location on the webpage in response to receiving the video content and based at least in part on the fingerprint.

In some embodiments, a computer-implemented method can include receiving a request to render on a compute device a webpage that includes a job posting from a user. In response to the request a widget can be executed. The widget can be configured to identify a fingerprint associated with the webpage. At least a portion of the fingerprint can represent the job posting. The widget can be configured to transmit a query to an application programming interface (API) to map the fingerprint to a video content. The video content to be rendered on the webpage can be received from the API.

DETAILED DESCRIPTION

Figure 1:
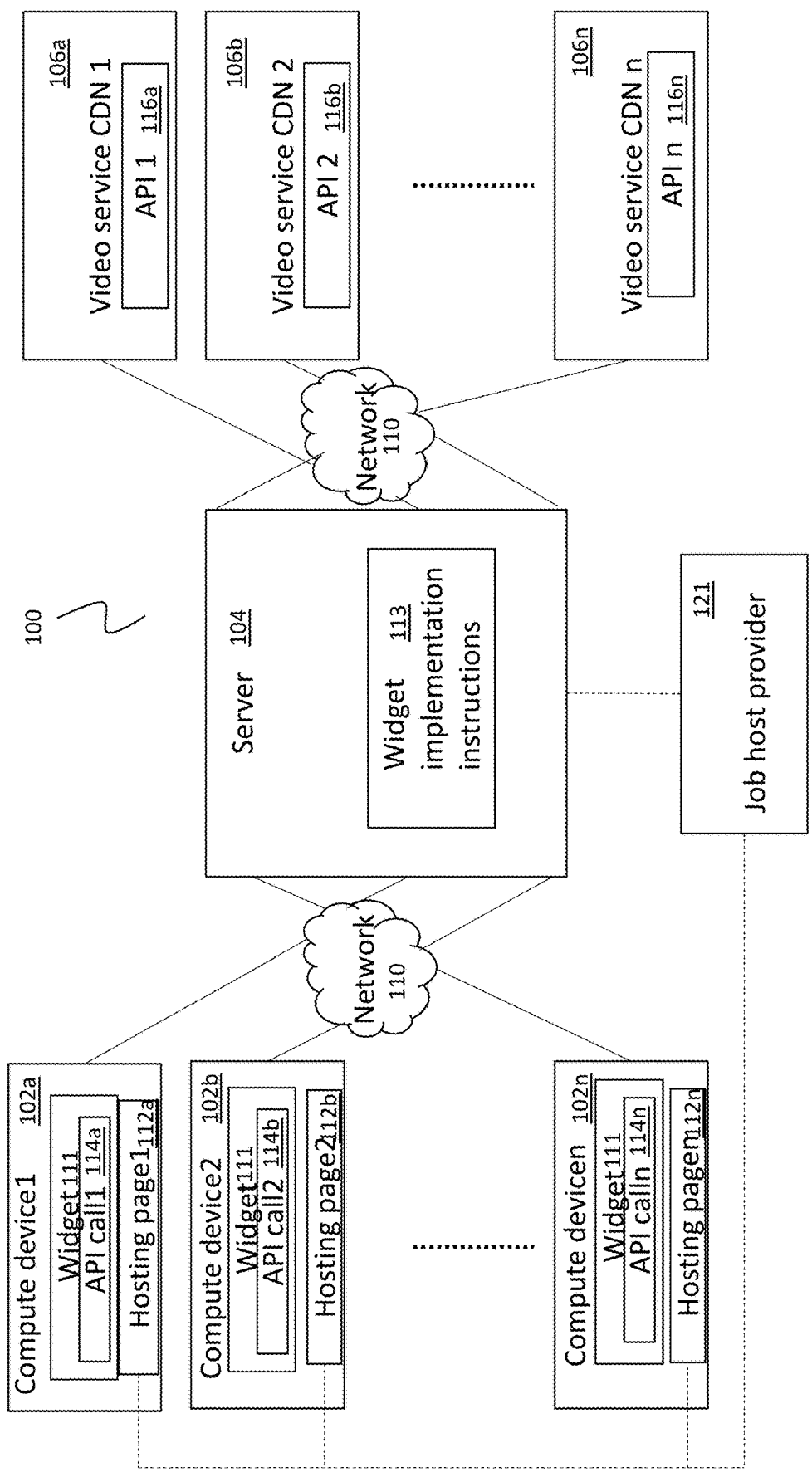
FIG. 1 is a schematic description of a system for mapping media assets with job host providers, according to some embodiments.

Non-limiting examples of various aspects and variations of the embodiments are described herein and illustrated in the accompanying drawings.

Embodiments described herein relate to apparatus and methods for mapping media (e.g., media assets such as video, audio, images, etc.) with a job host provider (e.g., an organization hosting career page(s) that lists job postings). The mapping can be performed independent of the media format and/or job host platform.

Most organizations have webpages that provide a list of job postings for the organization. Job seekers interact with such webpages and/or career page(s) when seeking and applying for a job with the organization. These career page(s) are hosted by the organization (e.g., a "job host provider") on their platform. Job host providers often include media assets (e.g., video, audio, images, etc.) to keep the job seekers engaged so as to stay competitive. For example, each job posting can be mapped to an appropriate video that encourages job seekers to apply for the job posting. Put differently, each job posting can be associated with a media asset that improves engagement with the job seekers.

Large organizations may have career page(s) with thousands of job postings. Therefore, managing media and/or media assets for large organizations can be a cumbersome process. Typically, organizations employ third-party services (e.g., a "video content provider") to provide media assets and to manage the media content. Organizations can access and pick an appropriate video for a specific job posting from one or more video content providers. For example, the video content providers may have platforms that include several videos. Each video could be associated with a specific job posting.

To map and insert a video with a job posting, generally, video content provider platforms are typically manually queried. Put differently, an administrator associated with the job host provider can review the videos that are stored in the video content provider's platform. The administrator can then determine a best match for a specific job posting. The best match video can be manually inserted into the career webpage at a position close to the job posting.

This known method of manually querying and inserting a media asset on a webpage, however, can be extremely challenging. For instance, inserting media assets on a career page with several thousand job postings would be extremely time consuming. Therefore, a need exists to automate the process of mapping media assets from a third-party service (e.g., "video content provider") and inserting the media asset at an appropriate location in a career page.

Some existing methodologies attempt to automate this process. For example, some organizations design their career page by assigning a specific block on the career page to a specific job listing. Each job listed on the career page may be assigned a job identification number (i.e., job ID). A processor may be provided with instructions to map the job ID with a specific video. The video may then be inserted at the block associated with the job based on this mapping. Such methodologies, however, are not agnostic of the job host provider platform, the video content provider platform, and/or the media format. Put differently, these methodologies may work only for a specific organization's webpage. The video that is inserted into the career page may need to be formatted such that it is compatible with the organization's webpage.

Accordingly, embodiments described herein describe systems and methods for mapping videos with a job host provider such that the mapping is agnostic (e.g., independent) of the job host provider's platform, the media format, and/or the video content provider platform.

FIG. 1 is a schematic description of a system 100 for mapping media assets with job host providers (e.g., job host provider 121), according to some embodiments. The system 100 can include one or more compute devices, for example, compute device1 102a, compute device2 102b, compute devicen 102n, etc. (collectively referred to as compute device 102). Compute device 102 can be communicably coupled to a server 104 to receive widget implementation instructions 113 from the server 104 via a network 110. The compute device 102 can also be communicably coupled to one or more video content providers, for example, video service CDN1 106a, video service CDN2 106b, video service CDNn 106n, etc. (collectively referred to as video content provider 106) via the network 110 to receive media assets such as videos.

Each compute device 102 can render a respective hosting page 112 upon a user request. For instance, in response to a user request, compute device1 102a can render hosting page1 112a. Similarly, compute device2 102b can render hosting page2 112b. In response to rendering a hosting page 112, widget implementation instructions 113 can be transmitted to a compute device 102. The compute device 102 can execute a widget 111 upon receiving the widget implementation instructions 113. The widget 111 can generate Application Programming Interface (API) calls such that API call1 114a, API call2 114b, API calln 114n, etc. (collectively referred to as API call 114). API call 114 can cause the compute device 102 to interface with video content providers 106 via one or more APIs such as API1 116a, API2 116b, APIn 116n (collectively referred to as API 116). API 116 can be queried to retrieve a video content from the video content provider 106. The retrieved video can be transmitted to the compute device 102.

In some embodiments, a user (e.g., a job seeker) may have access to a compute device 102. The user can interact with a compute device 102 to request a webpage. For instance, a job seeker applying for a job can interact with compute device 102 to open a career page associated with an organization (e.g., a job host provider 121). The job host provider 121 can host various job listings on any suitable platform. In some embodiments, the job host provider 121 can have and/or may be granted access to the media assets stored/hosted by video content provider 106. These media assets can be inserted at an appropriate position on the career page(s). In some embodiments, the job host provider 121 can have access to the widget implementation instructions 113 stored in the server 104. Requesting the career page can cause the job host provider 121 to render a hosting page 112 on the compute device 102. The widget implementation instructions 113 when executed on the compute device 102 can cause the widget 111 to automatically insert media assets (e.g., videos) from video content provider 106 at an appropriate position on the hosting page 112. Some non-limiting examples of the compute device 102 include computers (e.g., desktops, personal computers, laptops etc.), tablets and e-readers (e.g., Apple iPad®, Samsung Galaxy® Tab, Microsoft Surface®, Amazon Kindle®, etc.), mobile devices and smart phones (e.g., Apple iPhone®, Samsung Galaxy®, Google Pixel®, etc.), etc.

In some embodiments, when a career page is requested by a job seeker, the compute device 102 can render a web browser (e.g., Google®, Mozilla®, Safari®, Internet Explorer®, etc.) on the compute device 102. The web browser may include browser extensions, browser plug-ins, etc. that may render the hosting page 112 on the compute device 102. Although, the technology is described as rendering a single hosting page 112 on a compute device 102, it should be readily apparent that any number of hosting pages 112 may be rendered on a compute device 102. For example, a job host provider may include job listings in multiple career pages. Each of these multiple career pages may be rendered as a separate hosting page 112 on the compute device 102.

In some embodiments, a server 104 can be communicably coupled to the compute device 102 via a network 110. The server 104 can be/include a compute device medium particularly suitable for data storage purpose and/or data processing purpose. The server 104 can include a memory, a communication interface and/or a processor. In some embodiments, the server 104 can include one or more processors running on a cloud platform (e.g., Microsoft Azure®, Amazon® web services, IBM® cloud computing, etc.). The server 104 and/or processor(s) may be any suitable processing device configured to run and/or execute a set of instructions or code, and may include one or more data processors, image processors, graphics processing units, digital signal processors, and/or central processing units. The server 104 and/or processor(s) may be, for example, a general purpose processor, a Field Programmable Gate Array (FPGA), an Application Specific Integrated Circuit (ASIC), and/or the like.

The server 104 can include instructions to implement a widget (e.g., widget implementation instructions 113). These instructions when executed by a processor (not shown) can render a widget on a suitable device (e.g., compute device 102). When the hosting page 112 is rendered on the compute device 102, the server 104 can transmit widget implementation instructions 113 to the compute device 102 via the network 110.

The network 110 can be, for example, a digital telecommunication network of servers (e.g., server 104) and/or compute devices (e.g., compute device 102). The servers and/or computes device on the network can be connected via one or more wired or wireless communication networks (not shown) to share resources such as, for example, data storage and/or computing power. The wired or wireless communication networks between servers and/or compute devices of the network 110 can include one or more communication channels, for example, a radio frequency (RF) communication channel(s), a fiber optic commination channel(s), an electronic communication channel(s), and/or the like. The network 110 can be and/or include, for example, the Internet, an intranet, a local area network (LAN), and/or the like.

The widget implementation instructions 113 when executed by the compute device 102 can render a widget 111 on the compute device 102. In some implementations, the widget 111 can be a portable application that can be executed and rendered on a webpage. For example, the widget 111 can be a web widget that can be executed and rendered on a career page (e.g., hosting page 112). Generally, executing and rendering the widget 111 on a hosting page 112 does not require technical expertise. For example, an administrator associated with the job host provider 121 maintaining the career page(s) (e.g., rendered as hosting page 112 on compute device 102) can be a non-expert webmaster. The widget implementation instructions 113 can be executed independent of the type of compute device 102. For example, the widget implementation instructions 113 can be executed on desktops, laptops, smartphones, tablets, or any suitable compute device 102. The widget 111 can be rendered on any suitable web browser on which the hosting page 112 is rendered. For example, the widget 111 can be rendered on Google®, Mozilla®, Safari®, Internet Explorer®, and/or the like.

When the hosting page 112 is rendered on the compute device 102, the hosting page 112 can cause the widget implementation instructions 113 to be executed, thereby rendering and executing widget 111. For example, a <script> tag on the hosting page 112 can point to the widget implementation instructions 113 to cause the widget 111 to execute. Upon executing the widget 111, the widget 111 can initialize an inspect process to inspect the hosting page 112. For example, the fingerprints can be a matching strategy to match a job listing on the hosting page 112 to a video based on hypertext markup language (HTML) components and/or cascading style sheet (CSS) components of the hosting page 112. More specifically, the widget 111 can inspect the hosting page 112 to determine the structure of the hosting page 112. The fingerprints can include information associated with a predetermined and/or predefined matching strategy. The matching strategy can be used to match a job listing on the hosting page 112 to a video.

Accordingly, upon determining the structure of the hosting page 112, the widget 111 can determine and/or extract information relating to one or more matching strategies based on the structure of the hosting page 112 that can match a job listing on the hosting page 112 to one or more videos. For instance, when the widget 111 inspects the hosting page 112, the widget 111 may look fora <div> element with class "job-info" nested inside a "job-container"<section> element. This can indicate the location of a block (e.g., block of HTML, or CSS) on the hosting page 112 with the job listing. The block can comprise information associated with the job listing. The widget 111 can automatically inspect the block associated with the job listing to identify metadata corresponding to the information in the job listing. For example, the widget 111 can identify and/or extract keywords associated with the job listing in the block. The widget 111 can then generate an API call 114 to request videos for the job listing.

Because the fingerprints are based on HTML and CSS components and because all hosting pages 112 regardless of the underlying infrastructure rely on HTML or CSS, the widget 111 can be executed and rendered irrespective of the job host provider 121 platform. Put differently, because the technology described herein uses HTML and CSS components to identify fingerprints, the technology described herein can be independent of the job host provider 121 platform. Additionally, because the widget 111 is executed upon rendering the hosting page 112 on the compute device 102, the media assets are mapped at the compute device 102. Put differently, the mapping does not occur at a centralized location (e.g., server or job host provider 121 platform). Rather, the mapping occurs at the compute device 102. Furthermore, videos are mapped only for hosting pages 112 that are rendered on the compute device 102. For example, the job host provider 121 may have multiple webpages/career pages such as one or more webpages with job descriptions, career homepage, blog post about the organization to which media assets can be mapped. Because the widget 111 is executed upon rendering a hosting page 112, the videos are mapped only for the rendered hosting page 112 and not all the other webpages associated with the job host provider 121.

In some embodiments, the API call 114 to request videos can be generated based on the keywords. For instance, the API call 114 can include a request to query for videos that may be tagged with the identified keywords. Additionally or alternatively, the API call 114 can be generated based on strategies other than keyword-mapping (e.g., constructing API calls based on identified keywords). For example, when the widget 111 inspects the block on the hosting page 112 that is associated with the job listing, the widget 111 may extract a topic associated with the job listing. The API call 114 can then be a request to query the most recent video on that particular topic from a predefined feed of videos.

In some embodiments, the fingerprints can have a specificity level associated with them that can be used to prioritize them. For instance, multiple fingerprints may be identified for a job listing on the hosting page 112. Each of these fingerprints can be assigned a priority so that the videos are queried based on the prioritization. For example, consider a job listing for a "Data Scientist" role in the "Engineering" department of an organization located in "Denver, Colorado" The keywords extracted from this job listing may be representative of "Data Scientist," "Engineering," and "Denver, Colorado" The fingerprints including matching strategies to match videos to the job listing can be indicative of: a) videos about data scientists, b) videos tagged with "Engineering," and c) videos relating to Denver, Colorado. These fingerprints can be prioritized to first request videos about data scientists. If videos about data scientists cannot be found, then request videos tagged with "Engineering." If videos tagged with "Engineering" cannot be found, then request videos relating to Denver, Colorado.

In some embodiments, a single API call 114 can include multiple fingerprints with their respective priorities. For instance in the example above, a single API call 114 can be constructed with a request to first query videos about data scientist, if unsuccessful, then query videos tagged with "Engineering," and lastly query videos relating to Denver, Colorado. Alternatively, multiple API calls can be generated (e.g., one for each fingerprint), and priorities can be assigned to the API calls 114 and/or the fingerprints.

The API call 114 can be transmitted via the network 110 to API 116. The API 116 can provide an interface to the video service provider 106. The API 116 can be any type of API (e.g., open API, internet API, composite API, and/or the like). Additionally, system 100 can include different types of API. For example, API 116a can be of one type while API 116b can be of a different type of API. Each video service provider 106 can include a respective API 116 that provides an interface to the video service provider 106. For example, API 116a can provide an interface to video service provider 106a. Similarly, API 116b can provide an interface to video service provider 106b and API 116n can provide an interface to video service provider 106n.

Each API call 114 can be transmitted to one or more APIs 116. For example, API call 114a can be transmitted to API 116a, API 116b, and API 116n. Alternatively, API call 114a can be transmitted only to API 116a and API 116b. In yet another implementation, API call 114a can be transmitted to API 116a while API call 114b can be transmitted to API 116b. The API 116 can be queried based on the API call 114 to identify one or more videos that can be added to the job listing in the hosting page 112. The API 116 can be queried based on the priorities associated to the fingerprints in the API call 114. For instance in the example above, the API 116 can first be queried to determine whether there are videos about data scientists in the video content provider's 106 database. If no video can be identified, then the API 116 can be queried to determine whether there are videos that are tagged as "Engineering." If that doesn't provide any video, then the API 116 can be queried to determine whether there are videos relating to Denver, Colorado Prioritizing the fingerprints ensures that no matter how much media is available and how many hosting pages 112 are rendered, each job listing will be mapped to the most relevant video.

In some embodiments, all APIs that the job host provider has access to can be queried simultaneously. For example, in FIG. 1, it may be possible that video content provider 106a, video content provider 106b, and video content provider 106c store/host the same/similar video assets. In such a scenario, API call 114a can be transmitted to API 116a, API 116b, and API 116n simultaneously. The first API to return a relevant video may be accepted as the video to be inserted in the hosting page 112. Each of these APIs can be queried simultaneously to identify videos that are best suited for a job listing. Alternatively, it may be possible that the video content provider 106a, video content provider 106b, and video content provider 106c have different video assets. In such a scenario, the APIs can be queried one after the other. For example, API call 114a can first be transmitted to API 116b. If a relevant video cannot be identified after API 116b is queried, then API call 114a can be transmitted to API 116a. If that doesn't provide a video, then API call 114a can be transmitted to API 116n.

When an API 116 is queried, the API 116 can access the videos hosted and/or stored on the video content provider 106 platform. Some non-limiting example video content provider 106 platforms include Vimeo®, YouTube®, Wowza®, Muvi®, etc. API 116 can retrieve the most suitable video based on the API call 114a. The retrieved video can be transmitted to the widget 111, and executed and rendered on the compute device 102 via the network 110. Because the fingerprints provide an insight to the structure of the hosting page 112, the widget 111 can determine the location for the video based on the fingerprints. For instance, the widget 111 can determine the block on the hosting page 112 associated with the job listing for which the video was mapped and determine a position for the video within the block. The widget 111 can then automatically insert the video in the appropriate position on the rendered hosting page 112.

In this manner, the most relevant video for a job listing on a hosting page 112 can be automatically identified, retrieved, and inserted. As discussed above, because the fingerprints are based on HTML and CSS components, the widget 111 can be executed and rendered irrespective of the job host provider platform. Therefore, identifying the most relevant video and automatically inserting the video in the appropriate location can be performed independent of the job host provider platform. Additionally, because the fingerprints and API calls 114 are defined in advance, the API 116 can be queried independent of the video content provider 106 platform. Accordingly, most suitable videos can be automatically inserted independent of the job host provider platform, video content provider platform, and/or the format of the video.

Figure 2:
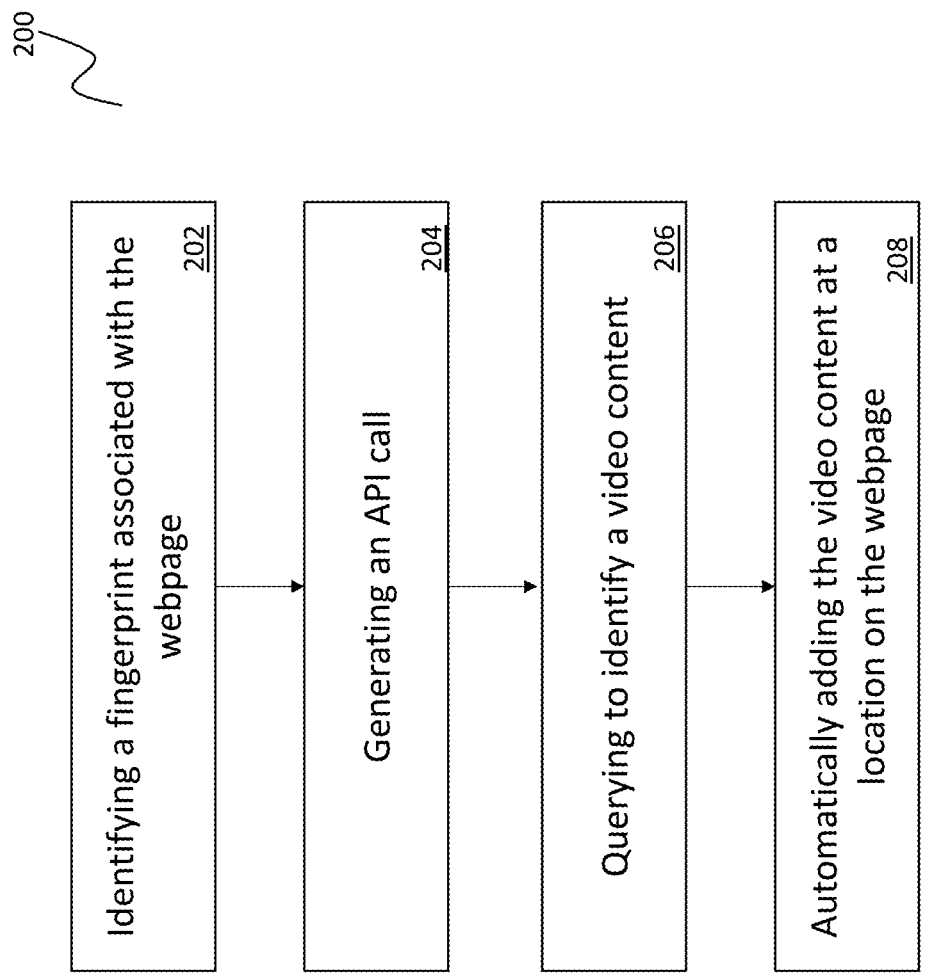
FIG. 2 is a flowchart of a method of automatically mapping and inserting video content on a hosting page, according to an embodiment.

FIG. 2 is a flow of a method 200 of automatically mapping and inserting video content on a hosting page, according to an embodiment. When a user requests a career page of an organization, a hosting page can be rendered in response to the request. In some embodiments, at 202, a widget can inspect the hosting page to identify fingerprints. Fingerprints can include information associated with a matching strategy to map one or more videos to a specific position on the hosting page. In some implementations, the fingerprints can be indicative of the type of hosting page that is being rendered. For example, the fingerprints can be indicative of whether the webpage that is being rendered is a job description career page, a career homepage, a blog post about the organization, etc. The type of hosting page may determine the matching strategy for the video. For example, a video for a job description career page may include content relating to the functions of the job as opposed to a video for the career homepage may include content relating to the culture of the organization. The fingerprints can also provide an insight to the structure of the hosting page. The structure of the hosting page can help identify various job listings and information associated with the listing. In some implementations, fingerprints can be identified based on a set of hypertext markup language (HTML) components. Additionally or alternatively, fingerprints can be identified based on a set of cascading style sheet (CSS) components. In some implementations, fingerprints can be assigned priorities. Put differently, the fingerprint with highest priority can map to the most relevant video while the fingerprint with the least priority can map to the least relevant video.

At 204, an API call can be generated based on the fingerprints. In some implementations, keywords can be extracted from the hosting page based on the fingerprints. These keywords can be used to generate the API call. Alternatively, API calls can be generated without keywords using at least some information associated with the hosting page. For example, based on a topic indicated on the hosting page, the API call can be generated to retrieve the most relevant videos associated with the topic.

At 206, an API can be queried based on the API call. For example, the API can be queried based on the priorities assigned to the fingerprints in the API call. If the API cannot identify a video for the fingerprint with the highest priority, the API queries a video for the fingerprint with next best priority. In some implementations, a job host provider may have access to multiple video content providers with different APIs. In such a scenario, all the APIs can be queried simultaneously to extract the most relevant videos. Alternatively, a first API may be queried first. If the first API does not retrieve a relevant video, a second API may be queried.

At 208, the retrieved video can be automatically added on the hosting page. For example, as discussed above, fingerprints can be indicative of the structure of the hosting page. The structure can dictate a position at which the video may be inserted. For instance, the structure may indicate that the hosting page includes a listing for jobs. The fingerprint can identify the block for a specific job listing. Accordingly, the video can be inserted in the block that is associated with the specific listing for which the video was mapped.

In this manner, videos can be automatically identified, mapped, and added on webpages. For example, when a hosting page is rendered, a widget can be automatically executed. The widget can automatically inspect the hosting page for fingerprints and can automatically generate API call(s) based on the fingerprints. The fingerprints automatically map relevant videos to the hosting page. The API call(s) can cause one or more APIs to be queried automatically. The media asset retrieved/extracted after querying the API can be automatically added to the hosting page at a suitable location. It should be readily understood that "automatically" refers to steps that can be performed without human intervention. As discussed above, the technology disclosed herein can be independent of the job provider platform, the video content provider platform, and/or the format of the video.

Figure 3:
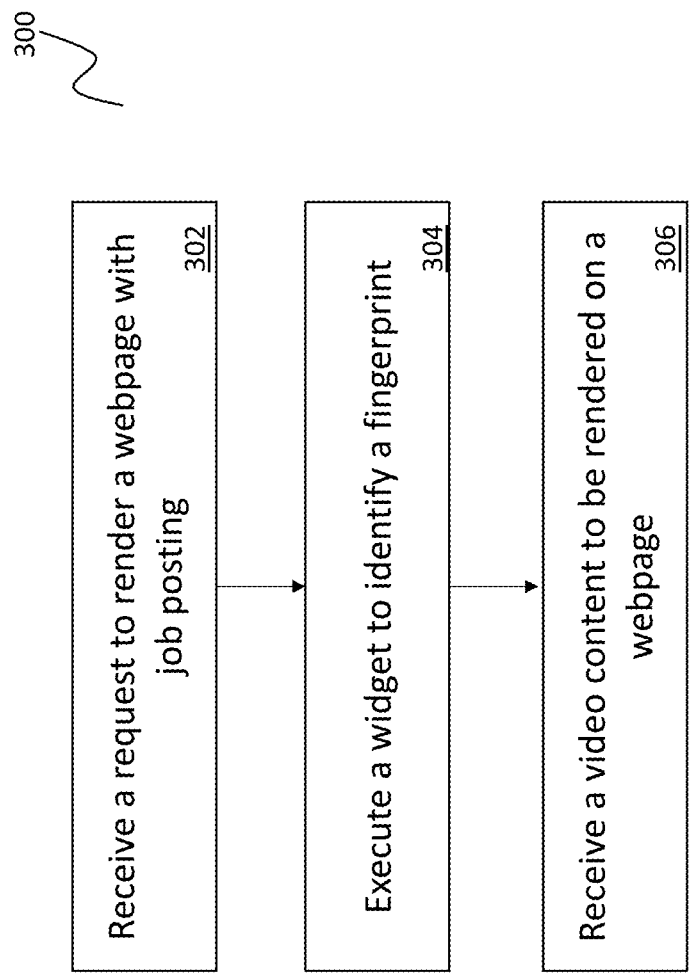
FIG. 3 is a flowchart of a method of automatically receiving a video to be added on a webpage, according to an embodiment.

FIG. 3 is a flowchart of a method 300 of automatically receiving a video to be added on a webpage, according to an embodiment. At 302, a compute device can receive a request from a user to render a webpage. The webpage can be a hosting page managed by a job host provider. For example, the job host provider can manage and control the content of the hosting page before the hosting page is accessed by and/or rendered on the compute device. The hosting page can include information related to careers and/or job listings. In some instances, multiple hosting pages may be rendered in response to the user's request. For instance, if several job postings are listed in multiple webpages, all the webpages may be rendered sequentially on the compute device.

At 304, in response to the request to render the webpage, a widget can be executed via the hosting page. For instance, the widget implementation instructions can be included in the script (HTML or CSS) of the webpage. Rendering the hosting page can activate the widget functions and corresponding display on the compute device. In some implementations, the instructions to render the widget can be stored on a remote server. In some implementations, the instructions to render the widget can be stored on a cloud-based platform. In some implementations, the instructions to render the widget can be received in response to the request to render the webpage. The widget can be configured to identify fingerprints associated with the hosting page. The fingerprints can enable generating an API call that can include a query to retrieve the most relevant video for a specific portion of the hosting page. The widget can be configured to transmit the API call to one or more APIs. The API call can map the fingerprint to a most suitable video. The API can be queried based on the API call to retrieve the most suitable video.

At 306, the compute device can receive the most suitable video from the API. The retrieved video can be added at a suitable location on the hosting page based on the fingerprints. The video can be added independent of the job host provider platform, type of API, and/or format of the video.

Figure 4A:
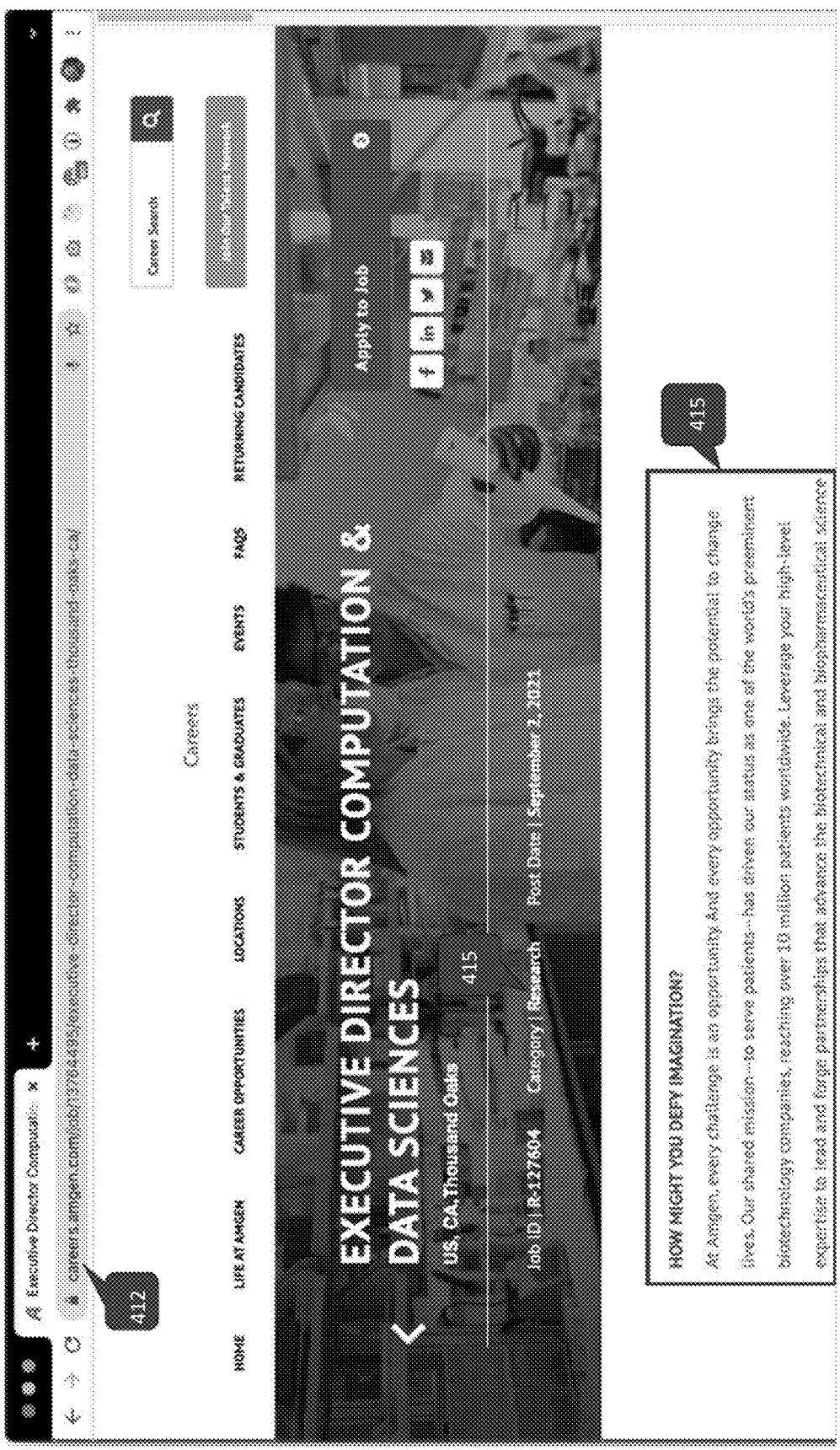
FIGS. 4A-4D illustrates a non-limiting example of automatically mapping and inserting video content on a hosting page, according to an embodiment.

FIGS. 4A-4D illustrates a non-limiting example of automatically mapping and inserting video content on a hosting page, according to an embodiment. As seen in FIG. 4A, a compute device can receive a request from a user to render a webpage. The webpage can be a hosting page (e.g., with URL 412) managed by a job host provider. In response to the request, the hosting page can be rendered on the compute device. The hosting page can include information related to careers and/or job listings. For example, the hosting page can include details about the job that is to be displayed. In FIG. 4A, the job to be displayed is a job under the category "research" 415. This detail (e.g., the job being under the category "research" 415) is displayed in an unstructured format on the hosting page. Information relating to the job description may be displayed initially without any engaging media asset. For instance, in FIG. 4A, information relating to the job description is displayed in a standard text format 415 without any engaging media assets.

Figure 4B:
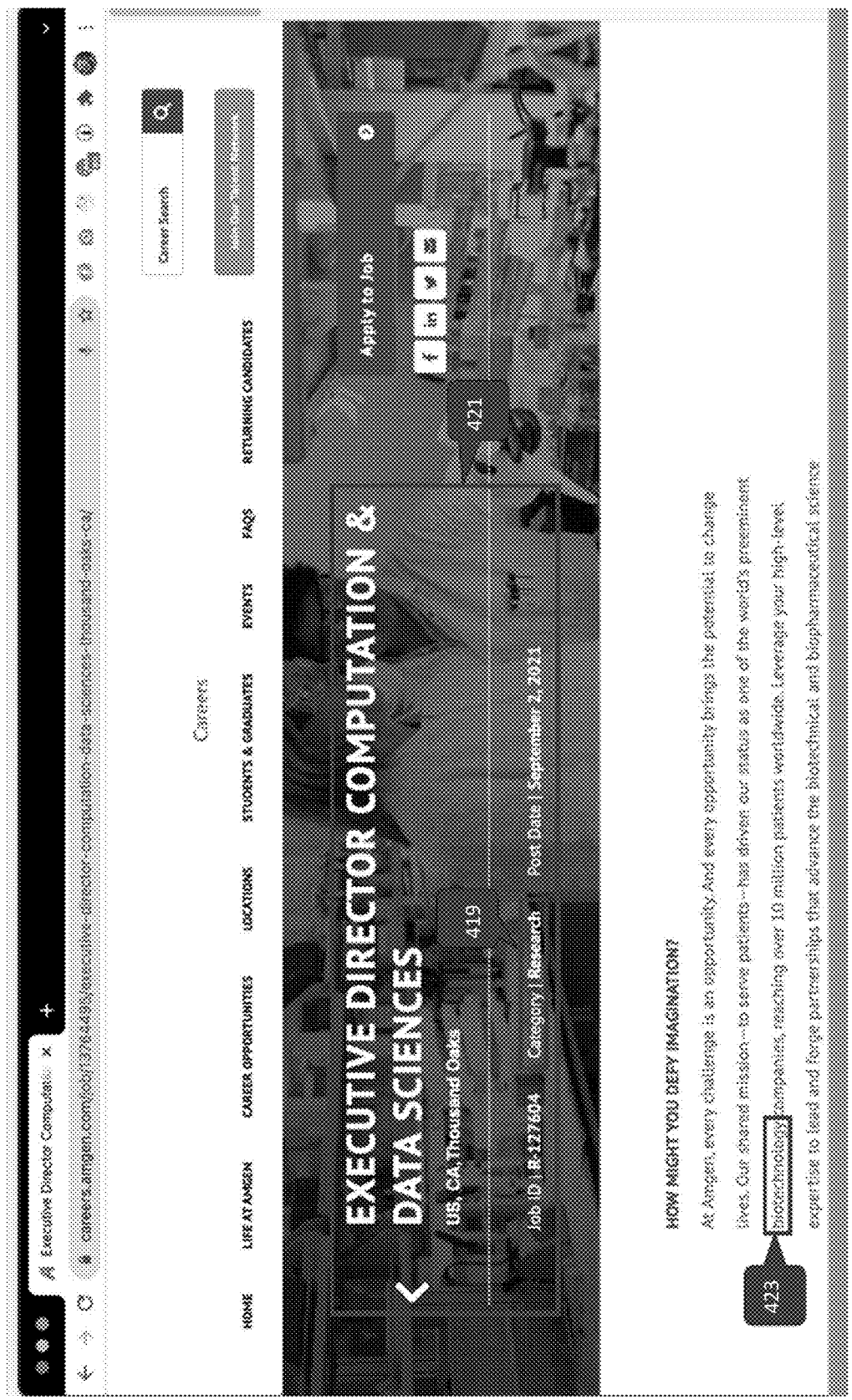

In FIG. 4B, a widget can be executed via the hosting page. In some implementations, widget implementation instructions can be included in the script of the hosting page. In some implementations, instructions to render the widget can be transmitted from a remote server and/or a cloud-based platform. After the hosting page is rendered, the widget can be executed on the hosting page. The widget can be configured to identify fingerprints associated with the hosting page. For instance, the widget can initialize an inspect process to inspect the hosting page. The widget can inspect the hosting page to determine the structure of the hosting page. For example, in FIG. 4B, the widget can compare the job listing "EXECUTIVE DIRECTOR COMPUTATION & DATA SCIENCES" 421 to a known type(s) of fingerprint that represents the structure of the hosting page. Based on the structure, the widget can extract keywords to determine one or more matching strategies that can match the job listing 421 to one or more videos. For example, the widget can extract the category "research" 419 from the job listing 421. The widget can also extract keywords from the job description. For instance, in FIG. 4B, the widget can extract the term "biotechnology" 423 from the job description.

Figure 4C:

In FIG. 4C, the keywords that were extracted (e.g., job listing 421, "research" 419 from the job listing 421, term "biotechnology" 423 from the job description, etc.) can be used to construct an API call. For example, the extracted keywords are mapped (e.g., 425) one or more matching strategies that may be associated and/or included in the fingerprints. For instance, a fingerprint may include information about a matching strategy that can match a video based on the field of research. The extracted keyword "biotechnology" may be mapped to this matching strategy that maps a video based on the field of research. The matching strategy can be used to generate an API call 427. As described above, an API can be queried based on the API call to retrieve a relevant video. If the matching strategy does not return a video, another API call can be constructed to query the same API or a different API. If no video is returned at all, an API call to return a fallback video can be constructed.

Figure 4D:

In FIG. 4D, the retrieved identifier identifying a video can be transmitted to the widget. Because the fingerprints provide an insight to the structure of the hosting page, the widget can determine the location for the video based on the fingerprints. For instance, the video can be placed in a block (e.g., 429) on the hosting page that is associated with the job listing "EXECUTIVE DIRECTOR COMPUTATION &

DATA SCIENCES." Because the job title is for a director and one of the keywords extracted disclosed the category as "research," the retrieved identifier of the video pointing to the video based on fingerprint matching is a video from a director of "bioanalytical sciences" 431. The widget can use the retrieved identifier to place and play the video at the appropriate location (e.g., 429) on the hosting page. In this manner, the most relevant video for a job listing on a hosting page can be automatically identified, retrieved, and inserted independent of the job host provider platform, video content platform, and/or the format of the video.

It should be understood that the disclosed embodiments are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. Thus, it is to be understood that other embodiments can be utilized, and functional, logical, operational, organizational, structural and/or topological modifications may be made without departing from the scope of the disclosure. As such, all examples and/or embodiments are deemed to be non-limiting throughout this disclosure.

Some embodiments described herein relate to methods. It should be understood that such methods can be computer implemented methods (e.g., instructions stored in memory and executed on processors). Where methods described above indicate certain events occurring in certain order, the ordering of certain events can be modified. Additionally, certain of the events can be performed repeatedly, concurrently in a parallel process when possible, as well as performed sequentially as described above. Furthermore, certain embodiments can omit one or more described events.

All definitions, as defined and used herein, should be understood to control over dictionary definitions, definitions in documents incorporated by reference, and/or ordinary meanings of the defined terms.

Examples of computer code include, but are not limited to, micro-code or micro-instructions, machine instructions, such as produced by a compiler, code used to produce a web service, and files containing higher-level instructions that are executed by a computer using an interpreter. For example, embodiments can be implemented using Python, Java, JavaScript, C++, and/or other programming languages, packages, and software development tools.

The drawings primarily are for illustrative purposes and are not intended to limit the scope of the subject matter described herein. The drawings are not necessarily to scale; in some instances, various aspects of the subject matter disclosed herein can be shown exaggerated or enlarged in the drawings to facilitate an understanding of different features. In the drawings, like reference characters generally refer to like features (e.g., functionally similar and/or structurally similar elements).

The acts performed as part of a disclosed method(s) can be ordered in any suitable way. Accordingly, embodiments can be constructed in which processes or steps are executed in an order different than illustrated, which can include performing some steps or processes simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements can optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of" "only one of" or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements can optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A computer-implemented method, comprising:
    inspecting a structure and/or content of a webpage that includes a job posting to identify a keyword associated with the job posting in response to a user loading the webpage;
    defining a fingerprint associated with the keyword, the fingerprint including information representative of a matching strategy to match the job posting to a video content;
    generating, based at least in part on the fingerprint, an application programming interface (API) call to query an API, the API being associated with a video content provider;
    querying the API, based at least in part on the API call, to identify the video content to be added to the webpage; and
    in response to receiving the video content, automatically adding the video content at a location on the webpage.

2. The computer-implemented method of claim 1, wherein inspecting the structure and/or content of the webpage includes inspecting hypertext markup language (HTML) associated with the webpage.

3. The computer-implemented method of claim 1, wherein inspecting the structure and/or content of the webpage includes inspecting a cascading style sheet (CSS) associated with the webpage.

4. The computer-implemented method of claim 1, wherein generating the API call includes identifying at least one keyword associated with the job posting included on the webpage.

5. The computer-implemented method of claim 1, wherein the fingerprint is a first fingerprint, the computer-implemented method further comprising:
    after querying the API and in response to not receiving the video content based at least in part on the first fingerprint, defining a second fingerprint associated with the webpage.

6. The computer-implemented method of claim 5, wherein the first fingerprint is assigned a priority to generate the API call that is higher than a priority assigned to the second fingerprint.

7. The computer-implemented method of claim 1, wherein querying the API includes identifying data associated with the video content, the computer-implemented method further comprising:
    inspecting the webpage for at least a portion of the data associated with the video content, the automatically adding the video includes in response to identifying the portion of the data associated with the video content includes automatically adding the portion of the data on the webpage.

8. The computer-implemented method of claim 1, wherein the API is a first API, the computer-implemented method further comprising:
    after querying the first API and in response to not receiving the video content based at least in part on the first fingerprint, querying a second API, based at least in part on the API call, to identify the video content to be added to the webpage.

9. The computer-implemented method of claim 8, wherein:
    the first API is of a type different from a type of the second API, and
    the API call is interface agnostic.

10. A computer-implemented method, comprising:
    receiving, from a user, a request to render on a compute device a webpage that includes a job posting;
    in response to the request, executing a widget, the widget being configured to:
        inspect a structure and/or content of the webpage to identify a keyword associated with the job posting,
        define a fingerprint associated with the keyword, at least a portion of the fingerprint representing a matching strategy to match the job posting to a video content, and
        transmit a query to an application programming interface (API) to map the fingerprint to the video content; and
    receiving, from the API, the video content to be rendered on the webpage.

11. The computer-implemented method of claim 10, wherein the API is a first API, the query is a first query, the computer-implemented method further comprising:
    after the widget transmits the first query to the first API and in response to not receiving the video content, receiving, from a second API, the video content to be rendered on the webpage, the widget being configured to transmit a second query to the second API to map the fingerprint to the video content.

12. The computer-implemented method of claim 11, wherein:
    the first API is a type different from a type of the second API,
    the widget being agnostic to the type of interface.

13. The computer-implemented method of claim 10, wherein the structure and/or content of the webpage inspected to identify the fingerprint includes a set of hypertext markup language (HTML) components.

14. The computer-implemented method of claim 10, wherein the structure and/or content of the webpage inspected to identify the fingerprint includes cascading style sheet (CSS) components.

15. The computer-implemented method of claim 10, wherein the widget configured to access a scanner to inspect the webpage to identify the fingerprint.

16. The computer-implemented method of claim 10, wherein the keyword is from a plurality of predefined keywords.

17. The computer-implemented method of claim 10, wherein the keyword is a second keyword, the fingerprint is a second fingerprint, the query is a second query, the widget further configured to:
    identify a first keyword associated with the job posting;

define a first fingerprint associated with the first keyword, at least a portion of the first fingerprint representing a matching strategy to match the job posting; and transmitting a first query to the API, the widget configured to inspect the structure and/or content of the webpage to identify the second keyword associated with the job posting after and in response to not receiving the video content in response to transmitting the first query to the API.

18. The computer-implemented method of claim 17, wherein the first fingerprint is assigned a priority to map the video content that is higher than a priority assigned to the second fingerprint.

19. The computer-implemented method of claim 10, wherein instructions to implement the widget is stored on a remote server.

20. The computer-implemented method of claim 10, wherein instructions to implement a widget is stored on a cloud platform.

\* \* \* \* \*